United States Patent
Donderici et al.

(10) Patent No.: US 10,520,628 B2
(45) Date of Patent: Dec. 31, 2019

(54) DOWNHOLE GRADIOMETRIC RANGING FOR T-INTERSECTION AND WELL AVOIDANCE UTILIZING TRANSMITTERS AND RECEIVERS HAVING MAGNETIC DIPOLES

(71) Applicant: Halliburton Energy Services, Inc., Houston, TX (US)

(72) Inventors: Burkay Donderici, Houston, TX (US); Baris Guner, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/491,582

(22) Filed: Sep. 19, 2014

(65) Prior Publication Data

US 2015/0091577 A1    Apr. 2, 2015

Related U.S. Application Data

(60) Provisional application No. 61/884,590, filed on Sep. 30, 2013.

(51) Int. Cl.
*G01V 3/02* (2006.01)
*E21B 47/022* (2012.01)
*G01V 3/26* (2006.01)

(52) U.S. Cl.
CPC .......... *G01V 3/02* (2013.01); *E21B 47/02216* (2013.01); *G01V 3/26* (2013.01)

(58) Field of Classification Search
CPC .... G01V 3/02; G01R 33/04; E21B 47/02216; E21B 47/024
See application file for complete search history.

(56) References Cited

U.S. PATENT DOCUMENTS

| | | | | |
|---|---|---|---|---|
| 4,016,942 A | * | 4/1977 | Wallis, Jr. | E21B 7/046 175/404 |
| 4,700,142 A | * | 10/1987 | Kuckes | G01V 3/26 166/66.5 |
| 4,791,373 A | * | 12/1988 | Kuckes | G01V 3/26 166/66.5 |
| 4,933,640 A | | 6/1990 | Kuckes | |
| 5,074,365 A | * | 12/1991 | Kuckes | E21B 7/04 166/66.5 |

(Continued)

OTHER PUBLICATIONS

International Search Report and the Written Opinion of the International Searching Authority, or the Declaration, dated Jan. 7, 2015, PCT/US2014/056798, 16 pages, International Searching Authority, KR.

(Continued)

*Primary Examiner* — Jermele M Hollington
*Assistant Examiner* — Dustin R Dickinson
(74) *Attorney, Agent, or Firm* — Haynes and Boone, LLP

(57) ABSTRACT

A ranging system utilizes gradiometric data to determine the direction to and distance between a first and second well without any knowledge or involvement of the borehole or formation characteristics in order to intersect and/or avoid the second well. In general, this is achieved by deploying a downhole assembly comprising transmitters and receivers having magnetic dipoles, along with bucking receivers positioned between the transmitters and receivers.

25 Claims, 10 Drawing Sheets

(56) References Cited

U.S. PATENT DOCUMENTS

| | | | |
|---|---|---|---|
| 5,084,678 A * | 1/1992 | Hutin | G01V 3/26 |
| | | | 175/45 |
| 5,230,087 A | 7/1993 | Waters et al. | |
| 5,230,387 A * | 7/1993 | Waters | E21B 7/068 |
| | | | 175/45 |
| 5,923,170 A * | 7/1999 | Kuckes | E21B 47/02216 |
| | | | 175/45 |
| 6,100,696 A * | 8/2000 | Sinclair | G01V 3/28 |
| | | | 324/338 |
| 6,509,738 B1 * | 1/2003 | Minerbo | G01V 3/28 |
| | | | 324/339 |
| 2006/0113112 A1 | 6/2006 | Waters | |
| 2009/0167309 A1 * | 7/2009 | Homan | G01V 3/28 |
| | | | 324/339 |
| 2009/0178850 A1 * | 7/2009 | Waters | E21B 7/04 |
| | | | 175/45 |
| 2009/0260879 A1 * | 10/2009 | Clark | E21B 47/02216 |
| | | | 175/45 |
| 2010/0044108 A1 | 2/2010 | Bespalov et al. | |
| 2010/0057365 A1 * | 3/2010 | Merchant | G01V 3/28 |
| | | | 702/7 |
| 2011/0298461 A1 * | 12/2011 | Bittar | G01V 3/28 |
| | | | 324/338 |
| 2012/0013339 A1 | 1/2012 | Kuckes | |
| 2012/0026314 A1 * | 2/2012 | Zhdanov | E21B 47/0002 |
| | | | 348/85 |
| 2013/0169278 A1 | 4/2013 | Bittar et al. | |
| 2013/0333946 A1 * | 12/2013 | Sugiura | E21B 44/00 |
| | | | 175/24 |
| 2013/0335092 A1 * | 12/2013 | Wu | G01V 3/28 |
| | | | 324/333 |

OTHER PUBLICATIONS

Examination Report issued for Australian Patent Application No. 2014327037, dated May 10, 2016, 3 pages.

* cited by examiner

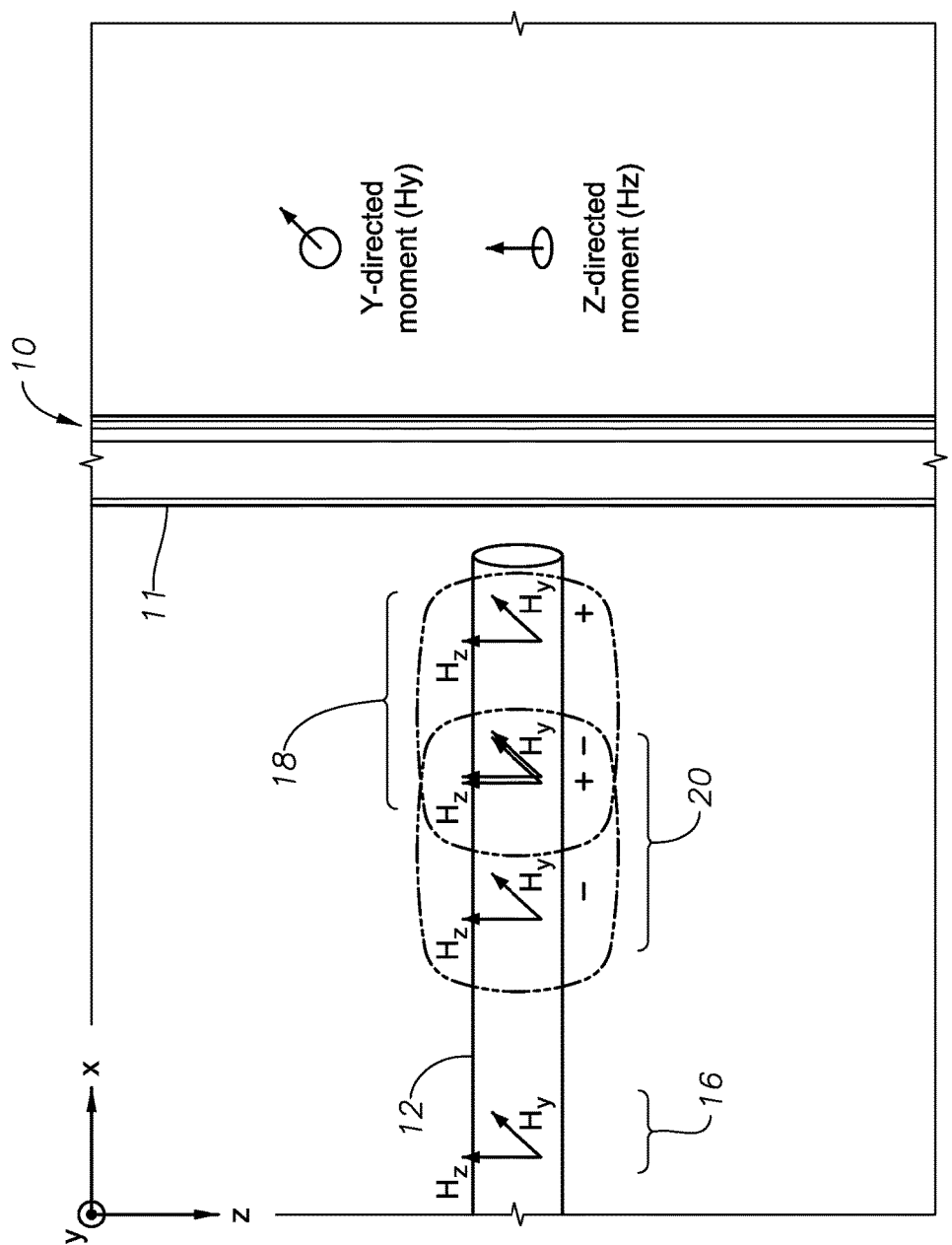

DOWNHOLE GRADIOMETRIC RANGING FOR T-INTERSECTION AND WELL AVOIDANCE UTILIZING TRANSMITTERS AND RECEIVERS HAVING MAGNETIC DIPOLES

PRIORITY

This application is a Non-Provisional of and claims priority to U.S. Provisional Patent Application No. 61/884,590 entitled, "DOWNHOLE GRADIOMETRIC RANGING FOR T-INTERSECTION AND WELL AVOIDANCE UTILIZING TRANSMITTERS & RECEIVERS HAVING MAGNETIC DIPOLES," filed Sep. 30, 2013, also naming Donderici et al. as inventors, the disclosure of which is hereby incorporated by reference in its entirety.

FIELD OF THE DISCLOSURE

The present disclosure relates generally to downhole ranging and, more specifically, to a ranging assembly utilizing magnetic dipole transmitters and receivers which analyze gradiometric data to determine and track the relative location of multiple intersecting wellbores, also referred to herein as "T-Intersecting" wellbores.

BACKGROUND

In some locations, it may be necessary to build drilling rigs very close to each other due to legal or natural land restrictions. The wells may then be directionally drilled underground to cover a vast region of land. In these cases, it is important to locate the presence of other wells to prevent hazards such as blow outs. However, if the well that is being drilled along a path that intersects another well (for example, a horizontal well in the presence of vertical wells), it may be difficult to ascertain the position of the second well with traditional methods.

Therefore, determining the position and direction of a conductive pipe (metallic casing, for example) accurately and efficiently is required in a variety of downhole applications. For example, one application is in the case of a blown out well in which the target well must be intersected very precisely by a relief well in order to stop the blowout. Other applications include well avoidance in which, as a well is being drilled, another well is detected and avoided.

A number of conventional approaches have attempted to provide solutions to this problem. In one method, coil antennas are used as transmitters, the amplitude of the fields induced on the target casing is measured, and a determination of the position and distance of the target is made based on these measurements. However, since the amplitude of the field is strongly dependent on the properties of the casing and the formation, the accuracy of this method may remain low. In another approach, an electrode type source is used to induce current on the target casing. Gradient of the magnetic field radiated by the target casing in addition to the magnetic field itself is measured in this approach. By using a relationship between the magnetic field and its gradient, the range to the target casing may be determined and be used for avoidance or intersection. However, this method can be insensitive if a true T-intersection occurs due to a cancellation of the fields at the receiver location.

Accordingly, there is a need in the art for improved downhole ranging techniques useful in T-intersection scenarios.

BRIEF DESCRIPTION OF THE DRAWINGS

FIG. 5 is a simplified embodiment of a relative positioning system utilizing a bucking receiver pair in the gradient calculation, according to certain illustrative embodiments of the present disclosure;

DESCRIPTION OF ILLUSTRATIVE EMBODIMENTS

Figure 1A:
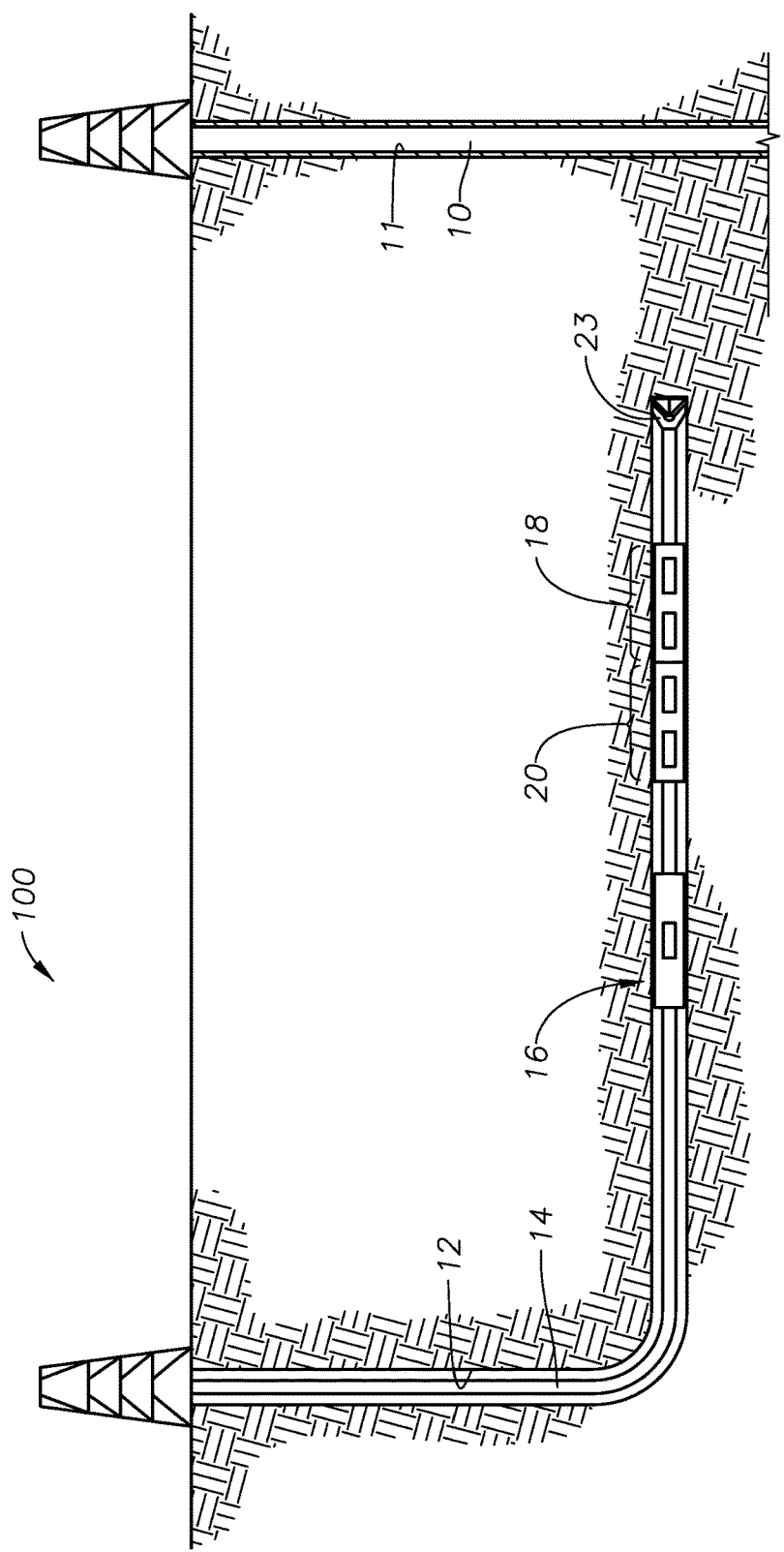
FIGS. 1A and 1B are simplified illustrations of a relative positioning system according to certain illustrative embodiments of the present disclosure.

Illustrative embodiments and related methodologies of the present disclosure are described below as they might be employed in a ranging system and method utilizing magnetic dipole transmitters/receivers to analyze gradiometric data and thereby drill and/or track the relative location of T-intersecting wellbores. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments and methodologies of the present disclosure describe ranging systems that utilize gradiometric data to determine the distance between a first and second well, for purposes of well avoidance or intersection, without any knowledge or involvement of the borehole or formation characteristics. In general, this may be achieved by deploying a downhole assembly comprising magnetic dipole transmitters and receivers, along with bucking receivers positioned between the transmitters and receivers. The magnetic dipoles may be embodied in a variety of ways, including, for example, coils, solenoids or magnetometers. An electromagnetic field is generated by the transmitters and induced onto the target casing to thereby produce a secondary electromagnetic field along the casing. The induced current is in the same axial direction throughout the target casing, thus the sensitivity to the target well is maintained in a T-intersection. A sum of this secondary magnetic field in addition to the direct field coming from the transmitter is measured by a set of receivers. The bucking receivers are configured to have opposite polarization to the main receiver set to thereby eliminate the direct signal between the transmitter and receiver. Using the measurements of the magnetic field from different receivers in a receiver set, gradient of the magnetic field may be calculated. Thereafter, utilizing various algorithms described herein, processing circuitry located on the downhole assembly (or at a remote location) analyzes the gradiometric data to determine the distance and direction to the T-intersecting target well.

Although the present disclosure may be utilized in a variety of applications (wireline, for example), the following description will focus on applications for accurately, and reliably positioning a well being drilled, the "relief/intersecting" well (i.e., second well), with respect to a nearby target first well, usually the blowout well, so that the second well intersects or avoids the target well as desired. The target well must be of a higher conductivity than the surrounding formation, which may be realized through the use of an elongated conductive body along the target well, such as, for example, casing that is already present in most wells to preserve well integrity.

The methods and systems of this disclosure are particularly desirable for the drilling of relief wells and/or well avoidance operations. In a well avoidance application, a well is drilled utilizing the positioning system described herein, which actively searches for other wells (or other conductive elongated structures), in the drilling path. If such wells or structures are detected, the positioning system alters the drill path accordingly. These and other applications and/or adaptations will be understood by those ordinarily skilled in the art having the benefit of this disclosure.

Figure 1B:
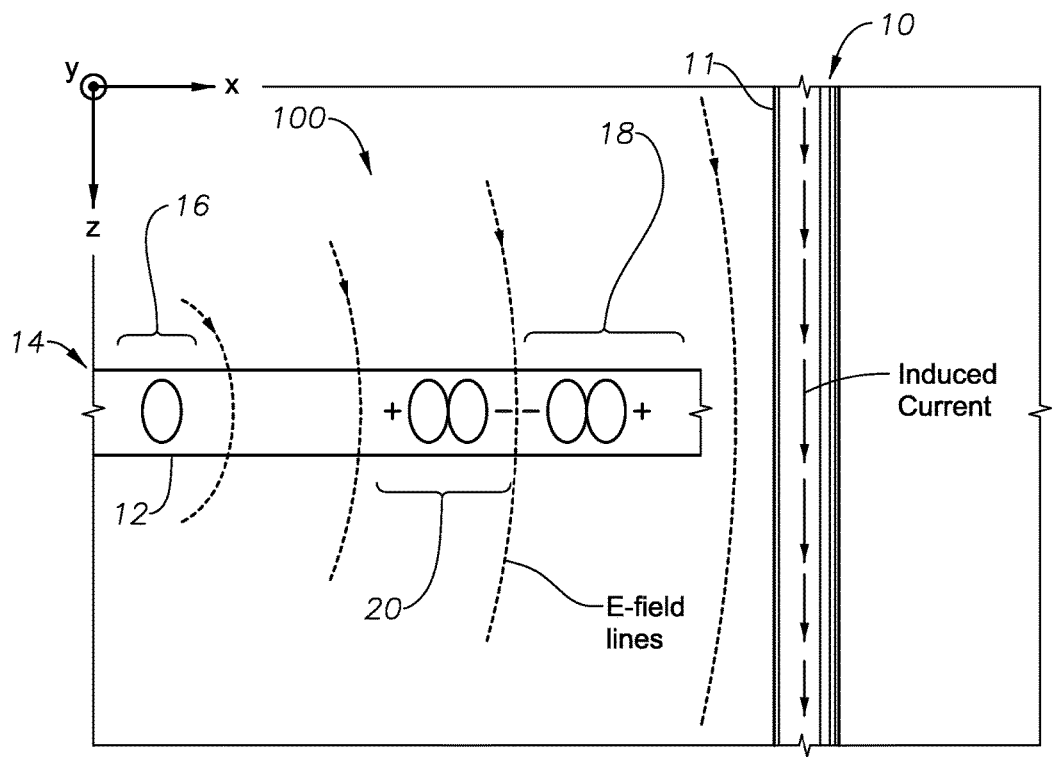

FIGS. 1A and 1B illustrate a simplified renderings of a relative positioning system 100 according to an exemplary embodiment of the present disclosure. In this embodiment, a well 10 has been drilled and cased with casing 11 using any suitable drilling technique, and thereafter has resulted in a blowout. A relief well 12 is then drilled using a bit 23 of drilling assembly 14 which may be, for example, a logging-while drilling ("LWD") assembly, measurement-while drilling assembly ("MWD") or other desired drilling assembly.

In this exemplary embodiment, drilling assembly 14 includes a bottom hole assembly having one or more magnetic dipole transmitters 16. As shown in FIG. 1B, drilling assembly 14 includes one transmitter 16 and two magnetic dipole receivers 18 that are axially separated along the axis of assembly 14. In those embodiments utilizing two transmitters 16, the transmitters are positioned in non-parallel directions (orthogonal, for example) in relation to one another to prevent blind spots where no current is induced on the target well, and at least four magnetic dipole receivers are positioned along drilling assembly 14 in order to take the gradient measurements. In order to simplify the decoupling process, the transmitters may be positioned in orthogonal relationship to one another. In the following description, the transmitters and receivers may be referred to as being orthogonally positioned in relation to one another; however, in alternative embodiments, the transmitters/receivers may be positioned at other non-parallel orientations relative to one another. Also, in the example of FIGS. 1A and 1B, two axially separated bucking receivers 20 are positioned adjacent to receivers 18 in order to eliminate the direct signal from transmitter 16.

As will be described in greater detail below, during an exemplary drilling operation using relative positioning system 100, drilling assembly 14 is deployed downhole to drill relief well 12 after a blow out of well 10. As relief well 12 approaches blow out well 10, in order to maintain relief well 12 at the desired distance and direction (i.e., trajectory) to well 10, relative positioning system 100 activates transmitter(s) 16 to induce a current along target casing 11 of well 10 that results in a magnetic field radiating from target casing 11. Axially separated receivers 18 then sense the magnetic field and the associated gradient measurements. Local or remote processing circuitry then utilizes the gradiometric data of the received magnetic field to determine the distance and direction to well 10. Once the relative position is determined, the circuitry generates signals necessary to steer the drilling assembly 14 in the direction needed to intersect or avoid well 10.

Figure 2:
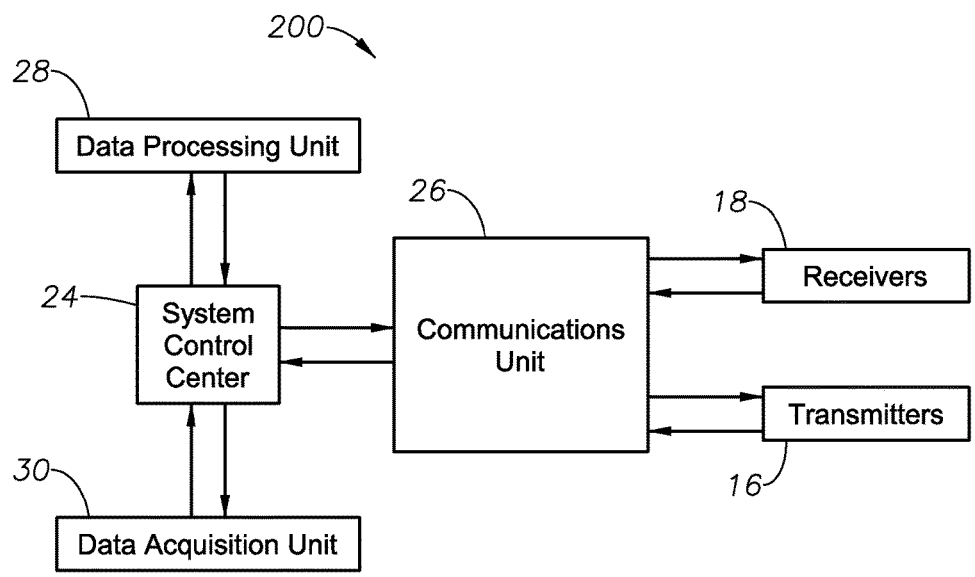
FIG. 2 is a block diagram of processing circuitry utilized in a relative positioning system, according to certain illustrative embodiments of the present invention.

FIG. 2 is a block diagram of processing circuitry 200 utilized in a relative positioning system to perform T-intersections, according to certain illustrative embodiments of the present invention. A system control center 24 manages the operational procedures described herein. In the simple example shown in FIG. 2, a system with a single transmitter is shown. However, to prevent blind spots where no current is induced on target casing 11, transmitter unit 16 may at least consist of two coils in orthogonal directions. Receiver set 18 may contain at least four coil antennas for the gradient measurements in two orthogonal directions for the determination of the target's azimuthal angle. In other embodiments, however, the transmitters/receivers may be realized as for example, solenoids, magnetometers, or a variety of other realizations that approximate magnetic dipoles. Elimination of direct signal from transmitter(s) 16 to the receivers 18 may be accomplished using bucking coils 20; in other cases, direct signal elimination may be accomplished using alternative techniques, such as an analytical calculation of this effect. In those embodiments utilizing bucking receivers 20, receivers 18 shown in FIG. 2 would also include data from bucking receivers 20.

Communications unit 26 facilitates the interaction between system control center 24 and transmitter coil 16 & receiver coil 18. A visualization unit (not shown) may be connected to communications unit 26 to monitor the data; for example, an operator may intervene the system operations based on this data. System control center 24 also interacts with data processing unit 28 and data acquisition unit 30. Data processing unit 28 may convert the received data into information giving the target's position and direction. Thereafter, results may be displayed via the visualizing unit. System control center 24 can be located at the surface or in the well, in which case processed data is communicated to the surface.

As previously mentioned, drilling assembly 14 may include on-board circuitry, along with necessary processing/storage/communication circuitry, to perform the calculations described herein. In certain embodiments, that circuitry is communicably coupled to one or more magnetic dipole transmitters 16 utilized to generate electromagnetic fields, and also likewise coupled to magnetic dipole receivers 18 in order to process the electromagnetic waves received from the target well. Additionally, the circuitry on-board drilling assembly 14 may be communicably coupled via wired or wireless connections to the surface to thereby communicate data back uphole and/or to other assembly components (to steer a drill bit forming part of assembly 14, for example). In an alternate embodiment, the circuitry necessary to perform one or more aspects of the techniques described herein may be located at a remote location away from drilling assembly 14, such as the surface or in a different wellbore. For example, in certain embodiments, the transmitter may be located in another well or at the surface. These and other variations will be readily apparent to those ordinarily skilled in the art having the benefit of this disclosure.

Although not shown in FIG. 2, the on-board circuitry includes at least one processor and a non-transitory and computer-readable storage, all interconnected via a system bus. Software instructions executable by the processor for implementing the illustrative relative positioning methodologies described herein in may be stored in local storage or some other computer-readable medium. It will also be recognized that the positioning software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 3:
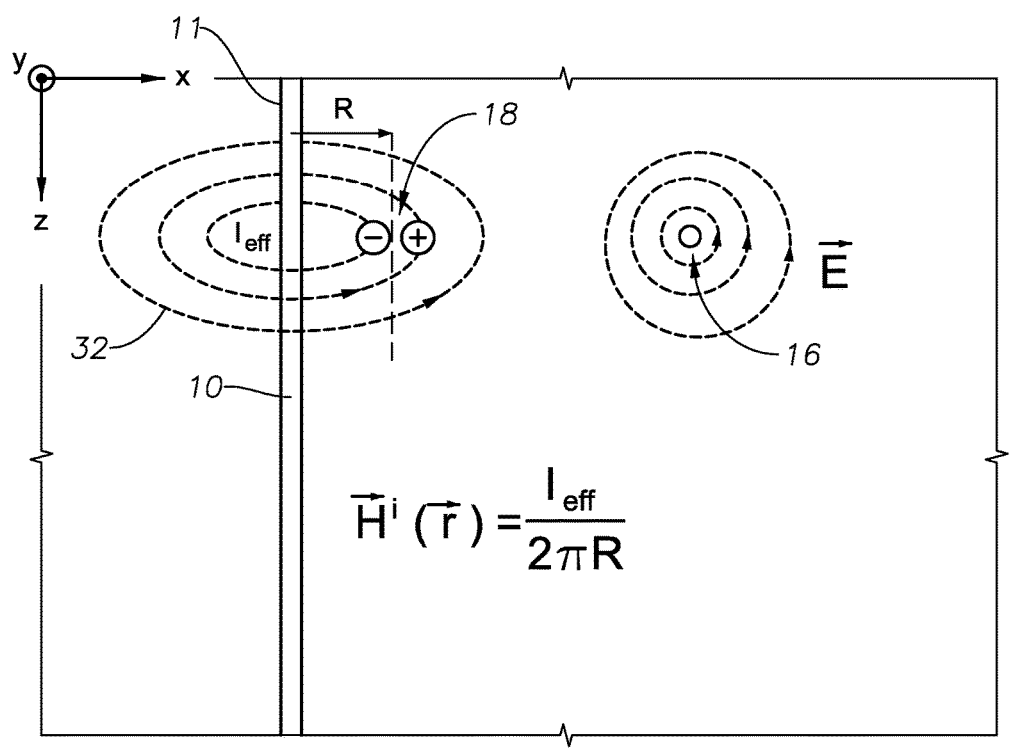
FIG. 3 is a simplified illustrative embodiment of a relative positioning system used to describe a methodology of the present disclosure.

Now that various embodiments have been described, the methodology by which relative positioning is determined will now be described. FIG. 3 illustrates a simplified illustrative embodiment of a relative positioning system that will be used to describe a methodology of the present disclosure. Here, relief well 12 and drilling assembly 14 are not shown for simplicity. Nevertheless, a crossection of a homogeneous formation (save for target well 10, transmitters 16 and receivers 18) in the x-z plane is depicted. In this example, a transmitting coil 16 with a magnetic moment in the y-direction (i.e., a coil that lies in the x-z plane) produces an electric field ($\vec{E}$) around it. A target well 10 whose principle axis is in z-direction is also shown. Wells generally have elongated metallic conductive bodies (such as steel casings) around them to fortify the well structure and prevent collapsing of the borehole wall. Since casing is much more conductive than the formation around it, a strong coupling of the electric field to the target casing occurs.

The coupling of the electric field produces a conduction current on the target casing 11 which would then induce a magnetic field 32 around the casing 11 whose magnitude can be found via the Biot-Savart law. If the induced current was constant, Biot-Savart law would reduce to the Ampere's law. In practical situations, current induced on the casing 11 is not constant, but for our purposes we may assume that field at a point $\vec{r}$ is given by:

$$\vec{H}^i(\vec{r}) = \frac{I_{eff}}{2\pi R}\hat{\phi}, \quad \text{Eq. (1)}$$

with little loss of accuracy where H is the magnetic field, $I_{eff}$ is an effective current, and R is the radial distance from target well 10 to point $\vec{r}$.

The gradient of the magnetic field at the same location, $$\frac{\partial \vec{H}^i(\vec{r})}{\partial R},$$

is given by:

$$\frac{\partial \vec{H}^i(\vec{r})}{\partial R} \approx -\frac{I_{eff}}{2\pi R^2}\hat{\phi}. \quad \text{Eq. (2)}$$

By taking the ratios of $\vec{H}^i(\vec{r})$ to $$\frac{\partial \vec{H}^i(\vec{r})}{\partial R},$$

the radial distance to target well 10 can be determined as follows:

$$R = \left|\frac{\vec{H}^i(\vec{r})}{\frac{\partial \vec{H}^i(\vec{r})}{\partial R}}\right|. \quad \text{Eq. (3)}$$

An illustrative design of receivers 18 will now be described. As described herein, the receivers are magnetic dipole realizations such as, for example, coils, solenoids, etc. In one embodiment, coil antennas having a magnetic moment in a certain direction are used. As a result, the coils are only sensitive to the component of the magnetic field in that direction. If this direction is called u, component of magnetic field in that direction can be written as:

$$\vec{H}^i(\vec{r}) \cdot \hat{u} = \frac{I_{eff}}{2\pi R}(\hat{\phi} \cdot \hat{u}). \quad \text{Eq. (4)}$$

Similarly, if two receiver coils (with the same magnetic moment) are axially separated along the downhole assembly by a very close distance in direction v, their difference is a very good approximation to the component of the gradient of the magnetic field in that direction. Assuming u and v are two of the axes in the Cartesian coordinate system, the gradient in direction v can be written as follows:

$$\frac{\partial \vec{H}^i(\vec{r}) \cdot \hat{u}}{\partial v} = -\frac{I_{eff}}{2\pi R^2}[(\hat{v} \cdot \hat{\phi})(\hat{u} \cdot \hat{r}) + (\hat{v} \cdot \hat{r})(\hat{u} \cdot \hat{\phi})]. \quad \text{Eq. (5)}$$

In Cartesian coordinates, $\hat{r}$ and $\hat{\phi}$ can be written as:

$$\hat{r} = \hat{x}\cos(\Phi) + \hat{y}\sin(\Phi)$$

$$\hat{\phi} = -\hat{x}\sin(\Phi) + \hat{y}\cos(\Phi) \quad \text{Eq. (6),}$$

where $\Phi$ is the azimuth angle of receiver 18 with respect to the casing 11; that is, the angle between the projection of the measured magnetic field vector onto the x-y plane of the coordinate system of receiver 18 and the y-axis.

If the receiver coils have their magnetic moments in y-direction and they are axially separated in the x-direction (or along the axis of assembly 14) as shown in FIG. 3, Equation 5 can be evaluated as:

$$\frac{\partial \vec{H}^i(\vec{r}) \cdot \hat{y}}{\partial x} = -\frac{I_{eff}}{2\pi R^2}[\cos^2(\Phi) - \sin^2(\Phi)] = -\frac{I_{eff}}{2\pi R^2}\cos(2\Phi). \quad \text{Eq. (7)}$$

Then, the distance to the target well may be calculated by:

$$R = \left| \frac{\vec{H}^i(\vec{r}) \cdot \hat{y}}{\frac{\partial \vec{H}^i(\vec{r}) \cdot \hat{y}}{\partial x}} \times \frac{\cos(2\Phi)}{\cos(\Phi)} \right|. \quad \text{Eq. (8)}$$

Thus, using partial derivatives and fields in a single direction brings forth an azimuthal dependence in the range calculation. Calculation of the azimuth angle will be described below. It should also be mentioned that, in a T-intersection application of a blowout well, rotating the relief well 12 around the target well 10 in an azimuthal direction should not change the results due to the circumferential symmetry of the problem. Nevertheless, to position the relief well for a T-intersection requires azimuthal information in the first place. Also, if the goal is well avoidance, determining the azimuth of the target well 10 is needed to determine the optimal drilling path.

For a well avoidance or intersection application, knowledge of the range to the target well 10 is not enough. The direction to the target well 10 should also be known. Therefore, illustrative embodiments of the present disclosure also propose different methodologies by which to determine direction. In one example, utilizing external information from another tool (electrode excitation ranging tool, surface excitation, etc.) is one such possibility. In an alternate embodiment, the magnetic field 32 in FIG. 3 may be utilized. By taking the gradient field from two orthogonal components in the axis transverse to the axis of the target well 10 (x- and y-components if the target well 10 lies in z-direction), the direction of the target well 10 may be determined. Any ambiguity in angle is also eliminated since the sign of the gradient tells whichever of the two coils that are used to determine the gradient in that direction is closest to the target well 10. Unfortunately, the gradient signal is small, thus this approach may lead to large errors in angle determination when the signal is weak (i.e., faraway from the target well 10 where accurate direction determination is important to approach the target well 10 rather than get away from it.)

In yet another illustrative approach, the total field may be utilized. Here, the angle between x and y components of the gradient field will give the direction of the target well 10. However, this angle may be between 0° and 90°, thus presenting a large ambiguity. Nevertheless, if the cross-coupling components in the total field are also considered, this range can be extended from 0° to 180°. An example implementation is realized using:

$$\Phi = \left| \tan^{-1}\left(\frac{H_{XX} - H_{YX}}{H_{YY} - H_{XY}}\right) \right|; \text{ If } \text{Re}\{H_{YX} + H_{XY}\} < 0 \quad \text{Eq. (9)}$$

-continued
$$\Phi = 180° - \left| \tan^{-1}\left(\frac{H_{XX} - H_{YX}}{H_{YY} - H_{XY}}\right) \right|; o.w..$$

Note that signs of the fields in this equation depend on the particular convention used. In Equation 9, $H_{ij}$ refers to the field measured by the receiver with magnetic moment in direction j corresponding to the transmitter in direction i. The 180° ambiguity can then be eliminated by using either the gradient information or looking at the temporal change of the calculated range. In general, some apriori information about the position of the target should be available as well, thus this ambiguity is not a huge concern in most practical cases.

As previously described, bucking receivers 20 are utilized in certain embodiments to eliminate the direct signal from transmitters 16. Bucking receivers 20 are also magnetic dipole realizations, such as coils, solenoids or magnetometers. Determination of the range requires that the magnetic field due to the current induced on the target casing 11, as well as its gradient, is measured at a point as given in Equation 3. However, receivers 18 also measure the direct signal created by transmitter 16, complicating the analysis. To eliminate this direct signal, several approaches may be considered. One illustrative approach is calculating the field of transmitter 16 at receivers 18 analytically, and subtracting this value from the gradient measurements. Note that this illustrative approach requires knowledge of the formation properties, as will be understood by those ordinarily skilled in this art having the benefit of this disclosure.

An alternative illustrative approach is to utilize bucking receivers 20, which are wound in opposite direction from the receivers 18 and located in such a way that the imaginary component of the direct signal between the receiver 18-bucking receiver 20 combination is cancelled. Although in formations that are different than air this cancellation is disturbed, in most cases effects are small.

Figure 4:
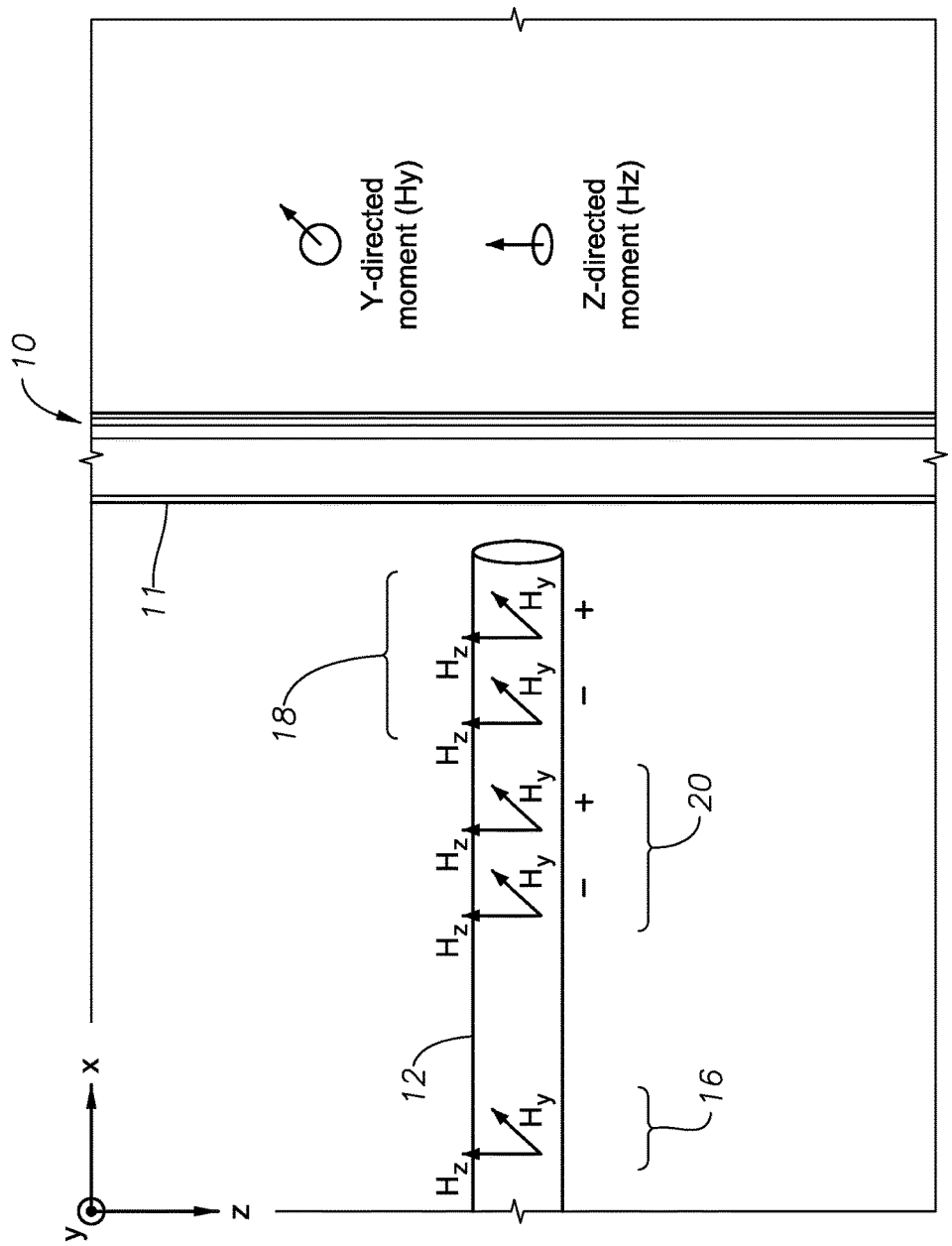
FIG. 4 is a simplified geometry of a relative positioning system that spans the entire plane transverse to the target well axis, according to certain illustrative embodiments of the present disclosure.

In certain illustrative embodiments, the transmitters and receivers have magnetic moments geometrically span the plane transverse to the axis of the target well. FIG. 4 illustrates one such example in which transmitters 16 (a transmitter pair), bucking receivers 20 (two pairs of bucking receivers), and receivers 18 (two pairs of receivers) all have magnetic moments in the y- and z-directions. As shown in FIG. 3, the axis of relief well 12 is in the x-direction, while the axis of target well 10 is in z-direction. Thus, if the goal is well intersection, in this example, a T-intersection would still occur if the axis of target well 10 were oriented in any direction in the y-z plane (i.e. the plane transverse to the relief well axis). Thus, in one illustrative embodiment, the system design that would account for such possibilities includes transmitters and receivers whose magnetic moments geometrically span the transverse plane. Accordingly, transmitters 16 and receivers 18 with magnetic moments in y- and z-directions may be used for this purpose as shown in FIG. 4.

Figure 6A:
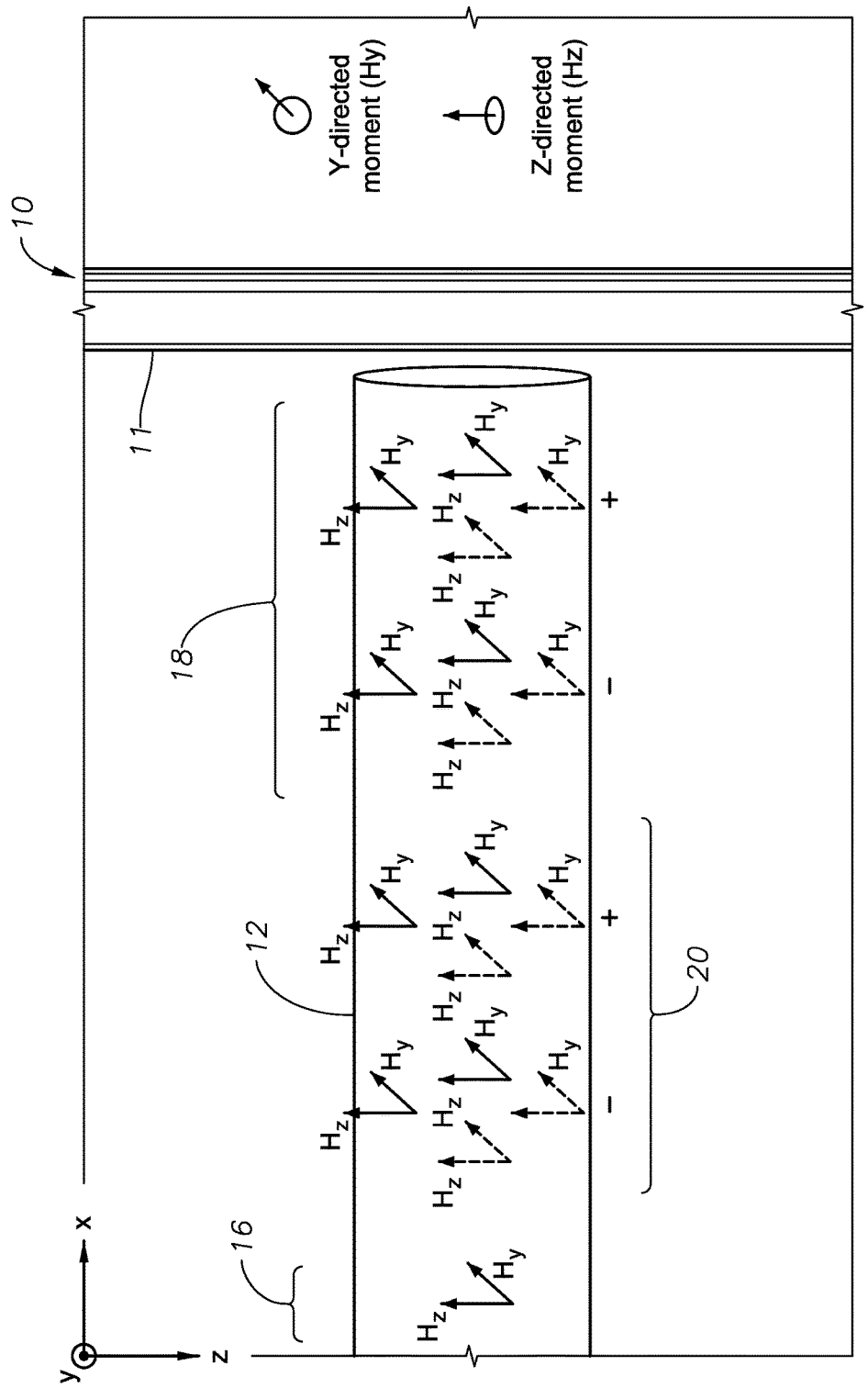
FIGS. 6A-B are simplified embodiments of an alternative embodiment of a relative positioning system.
Figure 6B:
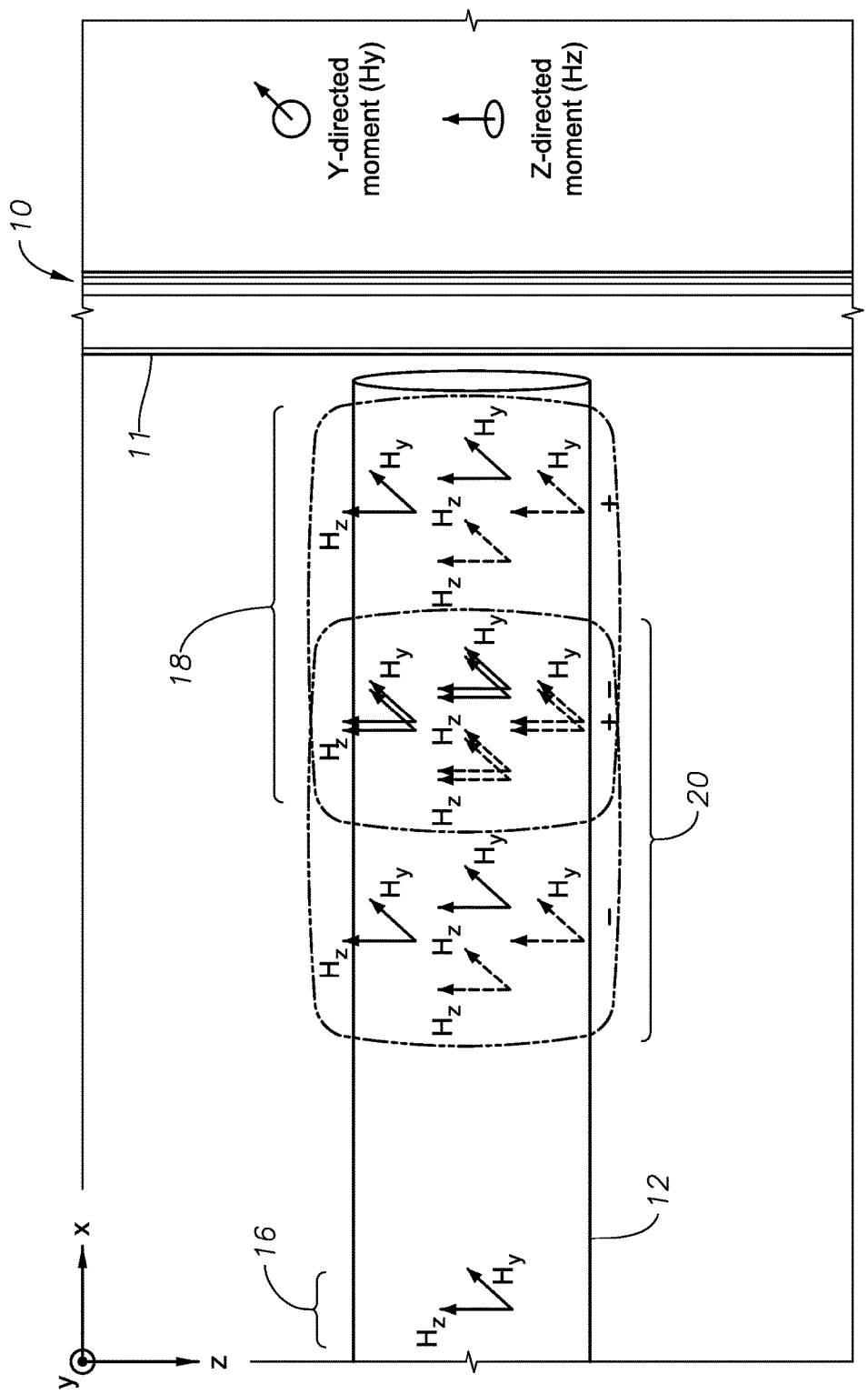

FIG. 5 is yet another simplified illustration of an embodiment of the present disclosure in which one of the bucking receiver pairs are utilized in the gradient calculation. Such an embodiment will allow a reduction in the number of receivers utilized. FIGS. 6A-B illustrates a similar alternative embodiment to that of FIGS. 4 and 5. Ideally, the system should detect and be able to avoid or intersect a target well in any arbitrary orientation. This can be accomplished by having transmitters with magnetic moments in two different directions and measuring the total gradient which requires gradient measurements in at least three directions that span the whole space. An example of this system is illustrated in FIG. 6A. Here, magnetic moment directions were chosen as y and z. In this particular implementation, a circumferentially symmetric group (around the x-axis in the y-z plane) of four pairs of dipoles are used in each main/receiver bucking set 18,20 to measure gradients in y and z directions. There are two such sets for both main and bucking receiver sets 18,20 to measure the gradient in the x-direction. Alternatively, other implementations that can measure magnetic field gradient in three orthogonal space directions may be designed, as would be understood by those ordinarily skilled in the art having the benefit of this disclosure. For example, bucking coils in gradient calculations as shown in FIG. 6B may be utilized.

Figure 7:
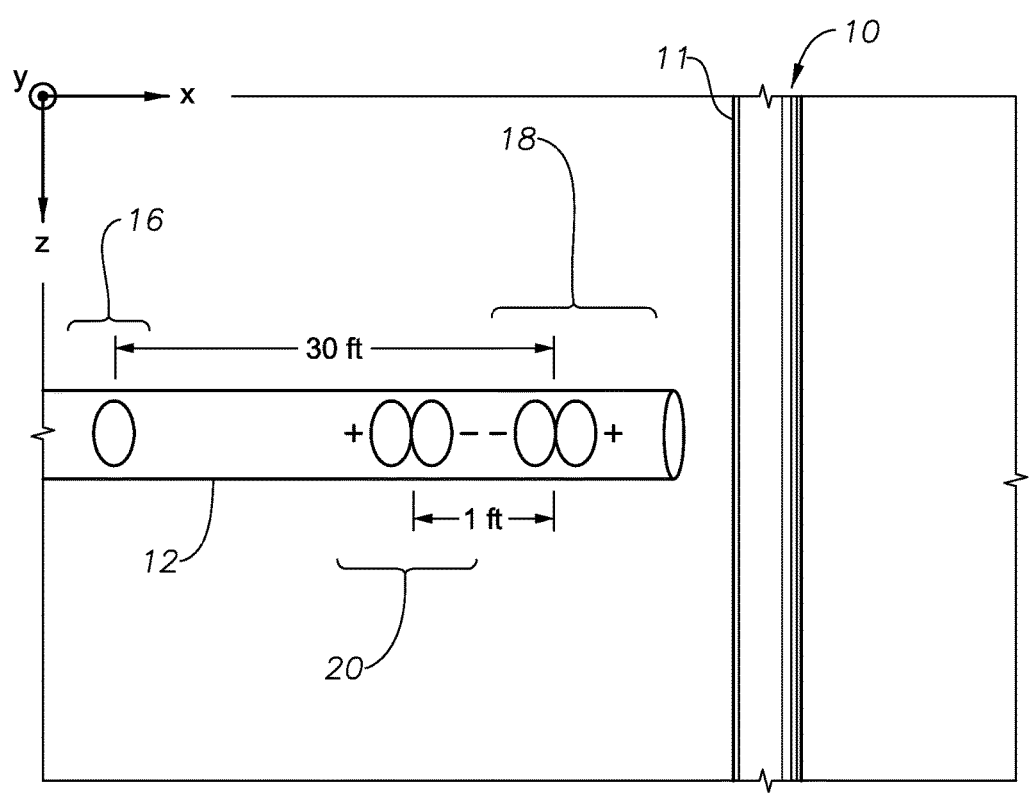
FIG. 7 illustrates the simplified geometry of a simulation based upon an illustrative embodiment of the present disclosure.

To show these effects, consider the example shown in FIG. 7. To show the use of the proposed system in a T-intersection application, an illustrative case is simulated where the distance from a target well 10 is calculated as relief well 12 moves toward the intersection. Simulation geometry is shown in FIG. 7. For simplicity purposes, an embodiment with a single transmitter 16 has been simulated and the target's azimuth angle is assumed to be known. In this simulation, operation frequency is selected to be equal to 10 Hz; formation is homogeneous with a resistivity of Rf=20 Ω-m, relative permittivity of 4 and permeability of 1. Target well 10 has a conductive casing 11 with 4 inch radius. Distance from transmitter 16 to the center of the main receiver set 18 is 1 ft. Bucking receiver set 20 is 1 ft away from the main receiver set. Distance between the both main and the bucking gradient receiver pairs is 8 inches.

Figure 8:
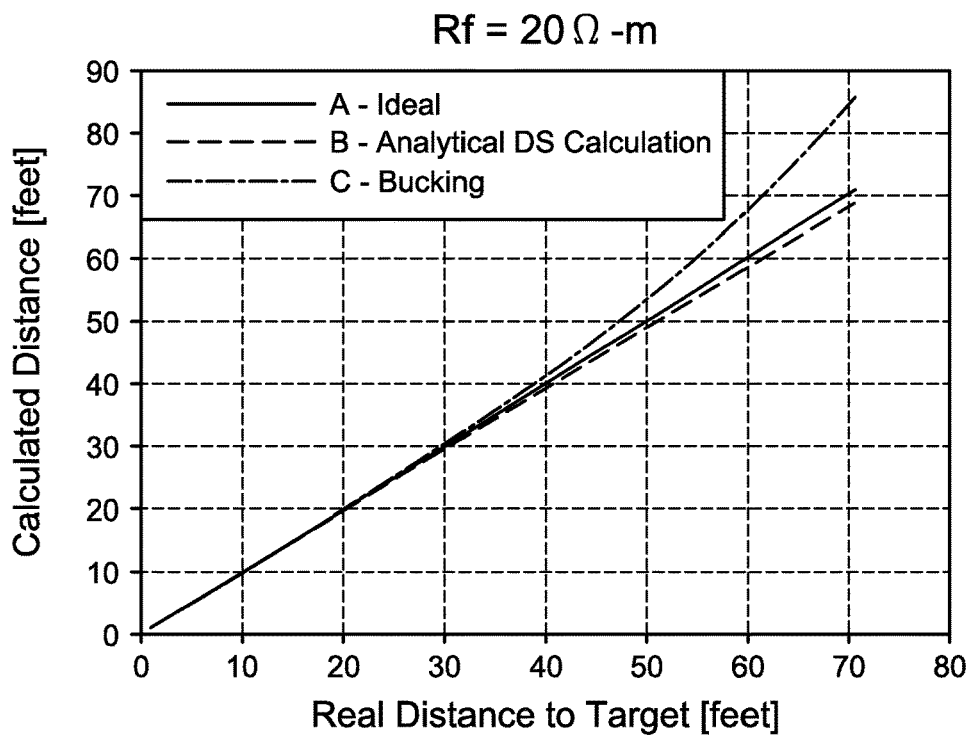
FIG. 8 plots the calculated distance in a T-intersection application using a illustrative system vs. the ideal results in a homogeneous formation.

In FIG. 8, the simulation results of the system of FIG. 7 are presented. The distance to target well 10 is the distance from the center of main receiver set 16 to the closest point on the target well 10. Line A is a reference that shows the ideal results where the calculated distance is equal to the real distance. Line B shows the results computed using analytical direct signal calculation. Line C shows mechanical elimination of the direct signal using bucking receivers. As can be seen, use of bucking receivers produces slightly worse results since they are tuned for perfect cancellation of direct signal in air. Nevertheless, results in both cases are very good with almost exact results as the distance of the target to the receivers gets closer than 30 ft. Even at a distance of 70 ft, error is around 20% using bucking receivers and around 3% using analytical direct signal elimination.

Figure 9:
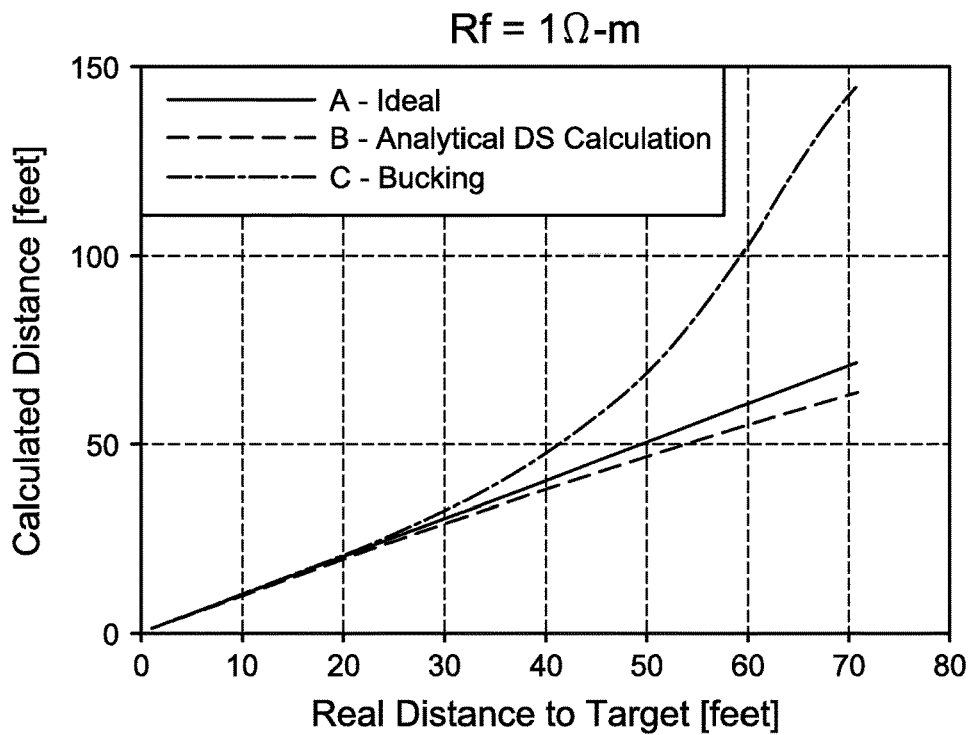
FIG. 9 plots the calculated distance in a T-intersection application using an illustrative system vs. the ideal results in a homogeneous formation.

FIG. 9 plots the results when the same simulation is repeated with the formation resistivity decreased to 1 Ω-m. This case models the relative position system performance in a more conductive medium and presents a tougher environment for distance calculation. Results remain very good up to a distance of around 25 ft from the target well. For further distances, bucking results start to become highly nonlinear. However, analytical direct signal elimination produces reasonable results even at a distance of 70 ft.

Figure 10:
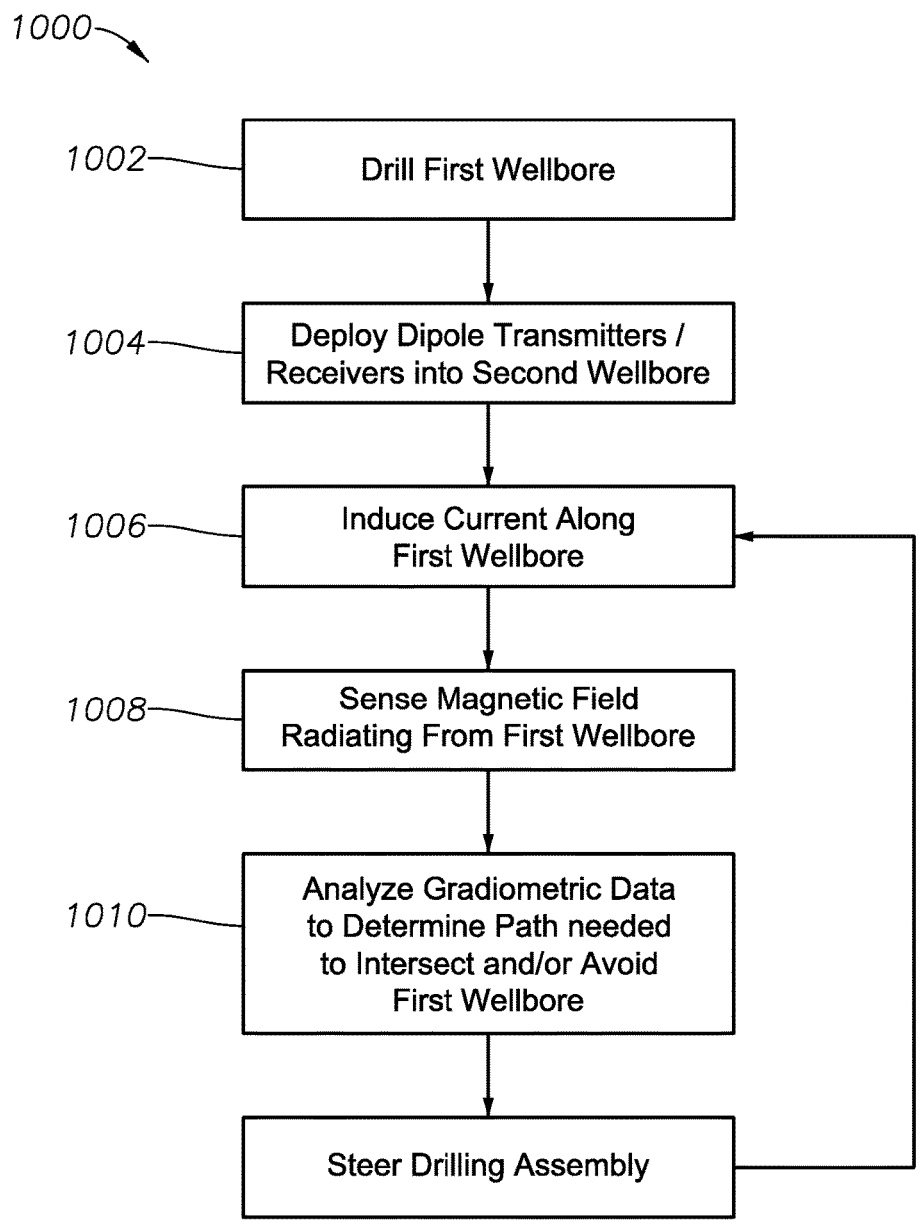
FIG. 10 is a flow chart of a ranging method employed by a relative positioning system to determine the distance between a first (i.e., target) and second wellbore necessary to achieve intersection and/or avoidance, according to certain illustrative methodologies of the present invention.

Now that various embodiments have been described, the methodology by which intersections and/or avoidance is achieve will now be described. As previously described, illustrative relative positioning systems generally consist of magnetic dipole realizations (transmitters and receivers) positioned to induce and measure gradient magnetic fields propagating from a target wellbore. FIG. 10 is a flow chart of a ranging method 1100 employed by a relative positioning system that utilizes gradiometric data to determine the distance between a first (i.e., target) and second wellbore, according to certain illustrative methodologies of the present invention. Again, the specific application may be, for example, the drilling of a relief well during a blowout scenario.

Nevertheless, at block 1002, a first wellbore is drilled using any suitable methodology. The first wellbore has a higher conductivity than the surrounding formation which, for example, may be achieved by casing the first wellbore or through utilization of some other elongated conductive body positioned along the first wellbore. At block 1004, at least two magnetic dipole transmitters and at least four magnetic dipole receivers are deployed into a second relief wellbore along a drilling assembly, wherein the second wellbore is oriented along an axis that intersects the first wellbore. This can happened, for example, after a blow out of the first wellbore occurs. The transmitters and receivers may be deployed in the second wellbore in a variety of ways including, for example, along a drilling assembly.

At block 1006, the transmitters are excited to thereby induce a current along the first wellbore that results in a magnetic field being radiated from the first wellbore. At block 1008, the magnetic field is then received using the receivers. At block 1010, using processing circuitry operationally coupled to the receivers, the relative positioning system utilizes the gradiometric data of the received magnetic field to determine the distance between the first and second wellbores. Here, the relative positioning system determines what actions, if any, are necessary to maintain or correct the desired drilling path necessary to intersect and/or avoid the first wellbore. Such actions may be, for example, a change in direction, speed, weight on bit, etc. Thereafter, the algorithm returns to block 1006 where it continues to excite the transmitters to continuously monitor and/or adjust the drill path as necessary.

As previously described, in an alternative application, the relative positioning system and methods of this disclosure are also useful in well avoidance operations. In such an application, a target well is not necessarily present. Nevertheless, in one illustrative method, the relative positioning system is deployed along a drilling assembly. During drilling, processing circuitry on-board (or remote to) the system actively searches for other wells or elongated conductive structures utilizing the various components and gradiometric analysis features described herein. If such wells or structures are detected, the positioning system alters the drill path accordingly.

Accordingly, embodiments of the present disclosure described herein utilize magnetic dipole transmitters/receivers to analyze gradient measurements to thereby determine a wellbore path necessary to intersect and/or avoid another wellbore, without the need to know formation and target properties. Therefore, the disclosed system allows an accurate and precise T-intersection application via widely available magnetic dipole receivers/transmitters. Such a system has important real life applications, particularly in situations where directional drilling is performed in a crowded oil field and existing wells must to be avoided. It is also useful if a blow out well is desired to be intersected by a relief well. Methods to eliminate the direct signal between transmitter and receiver coils have also been discussed to facilitate a practical implementation of this tool.

Embodiments and methods described herein further relate to any one or more of the following paragraphs:

1. A method for downhole ranging, the method comprising drilling a first wellbore, the first wellbore comprises an elongated conductive body; deploying at least two magnetic dipole transmitters and at least four magnetic dipole receivers in a second wellbore; inducing a current along the first wellbore using the transmitters that results in a magnetic field being emitted from the first wellbore; receiving the magnetic field utilizing the receivers, wherein a gradient field is measured; and utilizing the gradient field to determine a distance between the first and second wellbores.

2. A method as defined in paragraph 1, wherein the gradient field is measured in an axial direction along the second wellbore.

3. A method as defined in paragraphs 1 or 2, wherein the gradient field is measured in at least three directions.

4. A method as defined in any of paragraphs 1-3, further comprising determining a direction of the first wellbore in relation to the second wellbore, wherein determining the direction further comprises determining a total field of the received magnetic field; determining an angle between x and y components of the total field; and utilizing the angle to determine the direction.

5. A method as defined in any of paragraphs 1-4, further comprising utilizing the gradient field of the received magnetic field to thereby determine a direction of the first wellbore in relation to the second wellbore.

6. A method as defined in any of paragraphs 1-5, wherein determining the direction further comprises determining an angle between two orthogonal components of the gradient field, the orthogonal components being along an axis transverse to an axis of the first wellbore; and utilizing the angle to determine the direction.

7. A method as defined in any of paragraphs 1-6, wherein determining the distance between the first and second wellbores further comprises eliminating a direct signal emitted from the transmitters.

8. A method as defined in any of paragraphs 1-7, wherein the elimination of the direct signal comprises calculating a magnetic field of the transmitters at the receivers; and subtracting the calculated magnetic field from the received magnetic field.

9. A method as defined in any of paragraphs 1-8, wherein the elimination of the direct signal comprises utilizing two pairs of bucking receivers to cancel an imaginary component of the direct signal.

10. A method as defined in any of paragraphs 1-9, further comprising utilizing a pair of the bucking receivers to analyze the gradiometric data.

11. A method as defined in any of paragraphs 1-10, wherein the first wellbore is a blow out well; and the second wellbore is an intersecting well, wherein the method is utilized to stop a hydrocarbon spill emitting from the blow out well.

12. A method as defined in any of paragraphs 1-11, further comprising avoiding the target well based upon the determined distance and direction.

13. A method as defined in any of paragraphs 1-12, wherein the transmitters and receivers are deployed along a drilling assembly, logging assembly or wireline assembly.

14. A method as defined in any of paragraphs 1-13, further comprising steering a drilling assembly deployed along the second wellbore using the determined direction and distance between the first and second wellbores.

15. A downhole ranging assembly, comprising a bottom hole assembly comprising at least two magnetic dipole transmitters and at least four magnetic dipole receivers; and processing circuitry to implement a method comprising inducing a current along a first wellbore using the transmitters that results in a magnetic field being emitted from the first wellbore and toward a second wellbore, the first wellbore comprising an elongated conductive body; receiving the magnetic field utilizing the receivers, wherein a gradient field is measured; and utilizing the gradient field to determine a distance between the first and second wellbores.

16. A downhole ranging assembly as defined in paragraph 15, wherein the receivers are axially separated in a direction parallel to an axis of the bottom hole assembly such that the gradient field is measured in an axial direction along the bottom hole assembly.

17. A downhole ranging assembly as defined in paragraphs 15 or 16, further comprising four bucking receivers positioned along the bottom hole assembly between the transmitters and receivers.

18. A downhole ranging assembly as defined in any of paragraphs 15-17, wherein the bucking receivers comprise an opposite polarization in relation to the receivers.

19. A downhole ranging assembly as defined in any of paragraphs 15-18, wherein the bottom hole assembly is a drilling, wireline, or logging assembly.

20. A downhole ranging assembly as defined in any of paragraphs 15-19, wherein the transmitters are positioned in non-parallel relationship to one another along the bottom hole assembly; the receivers are axially separated in a direction parallel to an axis of the bottom hole assembly; and a magnetic moment of the receivers is oriented in a direction transverse to the axis of the bottom hole assembly.

21. A downhole ranging assembly as defined in any of paragraphs 15-20, wherein magnetic moments of the receivers span a plane transverse to an axis of the first wellbore.

22. A downhole ranging assembly as defined in any of paragraphs 15-21, wherein the transmitters and receivers comprise at least one of a coil, solenoid, or magnetometer.

23. A downhole ranging assembly as defined in any of paragraphs 15-22, wherein two of the receivers are bucking receivers that are positioned between the transmitters and the other receivers.

24. A downhole ranging assembly as defined in any of paragraphs 15-23, wherein the bucking receivers are utilized to measure the gradient field.

25. A downhole ranging assembly as defined in any of paragraphs 15-24, wherein the at least four receivers comprise two receiver sets having four pairs of magnetic dipoles, the receiver sets being symmetrically positioned around an axis of the bottom hole assembly; and the downhole ranging assembly further comprises two bucking receiver sets having four pairs of magnetic moments, the bucking receiver sets being symmetrically positioned around the axis of the bottom hole assembly between the transmitters and receivers.

Moreover, the methodologies described herein may be embodied within a system comprising processing circuitry to implement any of the methods, or a in a computer-program product comprising instructions which, when executed by at least one processor, causes the processor to perform any of the methods described herein.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for downhole ranging, the method comprising:
   drilling a first wellbore, the first wellbore comprises an elongated conductive body;
   deploying at least two magnetic dipole transmitters and at least four magnetic dipole receivers in a second wellbore, the receivers comprising main and bucking receivers;

using the bucking receivers, eliminating a direct signal emitted from the transmitter;

using an electric field generated by the transmitters, inducing a current along the first wellbore that results in a magnetic field being emitted from the first wellbore, wherein the induced current flows in a same axial direction throughout the first wellbore;

receiving the magnetic field utilizing the receivers, wherein a gradient field is measured using the magnetic field received by the main and bucking receivers; and utilizing the gradient field to determine a distance between the first and second wellbores.

2. A method as defined in claim 1, wherein the gradient field is measured in an axial direction along the second wellbore.

3. A method as defined in claim 1, wherein the gradient field is measured in at least three directions.

4. A method as defined in claim 1, further comprising determining a direction of the first wellbore in relation to the second wellbore, wherein determining the direction further comprises:
determining a total field of the received magnetic field;
determining an angle between x and y components of the total field; and
utilizing the angle to determine the direction.

5. A method as defined in claim 1, further comprising utilizing the gradient field of the received magnetic field to thereby determine a direction of the first wellbore in relation to the second wellbore.

6. A method as defined in claim 5, wherein determining the direction further comprises:
determining an angle between two orthogonal components of the gradient field, the orthogonal components being along an axis transverse to an axis of the first wellbore; and
utilizing the angle to determine the direction.

7. A method as defined in claim 1, wherein the elimination of the direct signal comprises:
calculating a magnetic field of the transmitters at the receivers; and
subtracting the calculated magnetic field from the received magnetic field.

8. A method as defined in claim 1, wherein the elimination of the direct signal comprises utilizing two pairs of bucking receivers to cancel an imaginary component of the direct signal.

9. A method as defined in claim 1, wherein:
the first wellbore is a blow out well; and
the second wellbore is an intersecting well, wherein the method is utilized to stop a hydrocarbon spill emitting from the blow out well.

10. A method as defined in claim 4, further comprising avoiding the target well based upon the determined distance and direction.

11. A method as defined in claim 1, wherein the transmitters and receivers are deployed along a drilling assembly, logging assembly or wireline assembly.

12. A method as defined in claim 4, further comprising steering a drilling assembly deployed along the second wellbore using the determined direction and distance between the first and second wellbores.

13. A downhole ranging system comprising processing circuitry to implement any of the methods in claims 6, 8, or 9-12.

14. A method as defined in claim 1, wherein the axis of the second wellbore is orthogonal to the first wellbore.

15. A downhole ranging assembly, comprising:
at least two magnetic dipole transmitters positioned along a bottom hole assembly;
at least four magnetic dipole receivers comprised of main and bucking receivers symmetrically positioned around the axis of the bottom hole assembly; and
processing circuitry coupled to the transmitter and receivers to perform an operation comprising:
using an electric field generated by the transmitters, inducing a current along the target wellbore that results in a magnetic field being emitted from the target wellbore, wherein the induced current flows in a same axial direction throughout the first wellbore;
receiving the magnetic field utilizing the receivers, wherein a gradient field is measured using the magnetic field received by the main and bucking receivers; and
utilizing the gradient field to determine a distance between the first and second wellbores.

16. A downhole ranging assembly as defined in claim 15, wherein the receivers are axially separated in a direction parallel to the axis of the bottom hole assembly such that the gradient field is measured in an axial direction along the bottom hole assembly.

17. A downhole ranging assembly as defined in claim 15, further comprising four bucking receivers positioned along the bottom hole assembly between the transmitters and main receivers.

18. A downhole ranging assembly as defined in claim 17, wherein the bucking receivers comprise an opposite polarization in relation to the main receivers.

19. A downhole ranging assembly as defined in claim 15, wherein the bottom hole assembly is a drilling, wireline, or logging assembly.

20. A downhole ranging assembly as defined in claim 15, wherein:
the receivers are axially separated in a direction parallel to the axis of the bottom hole assembly; and
a magnetic moment of the receivers is oriented in a direction transverse to the axis of the bottom hole assembly.

21. A downhole ranging assembly as defined in claim 15, wherein magnetic moments of the receivers span a plane transverse to the axis of the target wellbore.

22. A downhole ranging assembly as defined in claim 15, wherein the transmitters and receivers comprise at least one of a coil, solenoid, or magnetometer.

23. A downhole ranging assembly as defined in claim 15, wherein two of the receivers are bucking receivers that are positioned between the transmitters and main receivers.

24. A downhole ranging assembly as defined in claim 23, wherein the bucking receivers are utilized to measure a gradient field.

25. A downhole ranging assembly as defined in claim 15, wherein:
the at least four receivers comprise two main receiver sets having four pairs of magnetic dipoles, the main receiver sets being symmetrically positioned around the axis of the bottom hole assembly; and
the downhole ranging assembly further comprises two bucking receiver sets having four pairs of magnetic moments, the bucking receiver sets being symmetrically positioned around the axis of the bottom hole assembly between the transmitters and main receivers.

* * * * *